J. R. COOK.
POTATO DIGGER.
APPLICATION FILED APR. 4, 1908.

926,979.

Patented July 6, 1909.
2 SHEETS—SHEET 1.

Witnesses

Inventor
John R. Cook,
By Woodward & Chandlee
Attorney

J. R. COOK.
POTATO DIGGER.
APPLICATION FILED APR. 4, 1909.

926,979.

Patented July 6, 1909.
2 SHEETS—SHEET 2.

Witnesses
J. Adolph Bishop
E. L. Chandlee

Inventor
John R. Cook.
By Woodward & Chandlee
Attorney

UNITED STATES PATENT OFFICE.

JOHN R. COOK, OF LAWRENCE, MICHIGAN.

POTATO-DIGGER.

No. 926,979.   Specification of Letters Patent.   Patented July 6, 1909.

Application filed April 4, 1908. Serial No. 425,252.

*To all whom it may concern:*

Be it known that I, JOHN R. COOK, a citizen of the United States, residing at Lawrence, in the county of Van Buren and State of Michigan, have invented certain new and useful Improvements in Potato-Diggers, of which the following is a specification.

This invention relates to potato diggers and has for an object to provide a machine of this character which may be driven through a field for the collection of potatoes, and to so construct the digger whereby vines and weeds will be discharged separately from the potatoes.
A further object of this invention is to provide a potato digger which will effectively serve to dig the potatoes and deliver them to a crate carried by the machine whereby the potatoes will be ready for shipment.
Other objects and advantages will be apparent from the following description and it will be understood that changes in the specific structure shown and described may be made within the scope of the claim without departing from the spirit of the invention.

Figure 1:
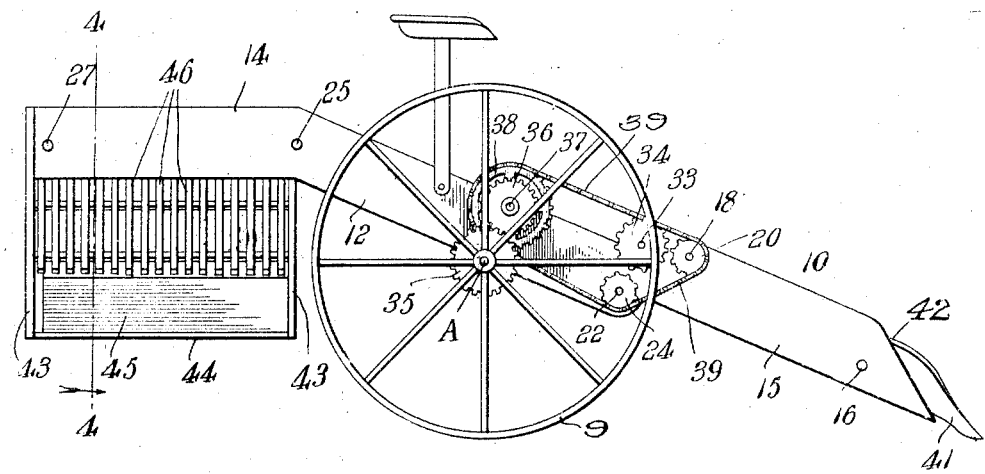
Figure 2:
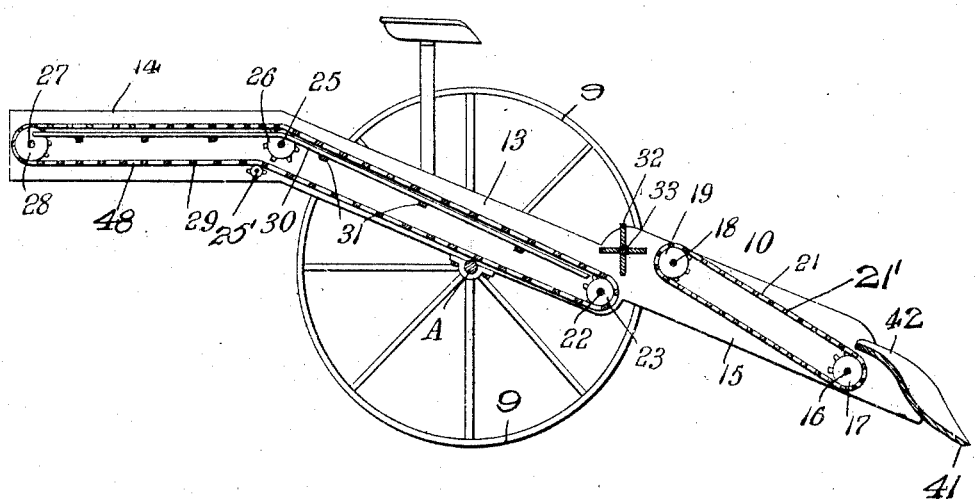
Figure 3:
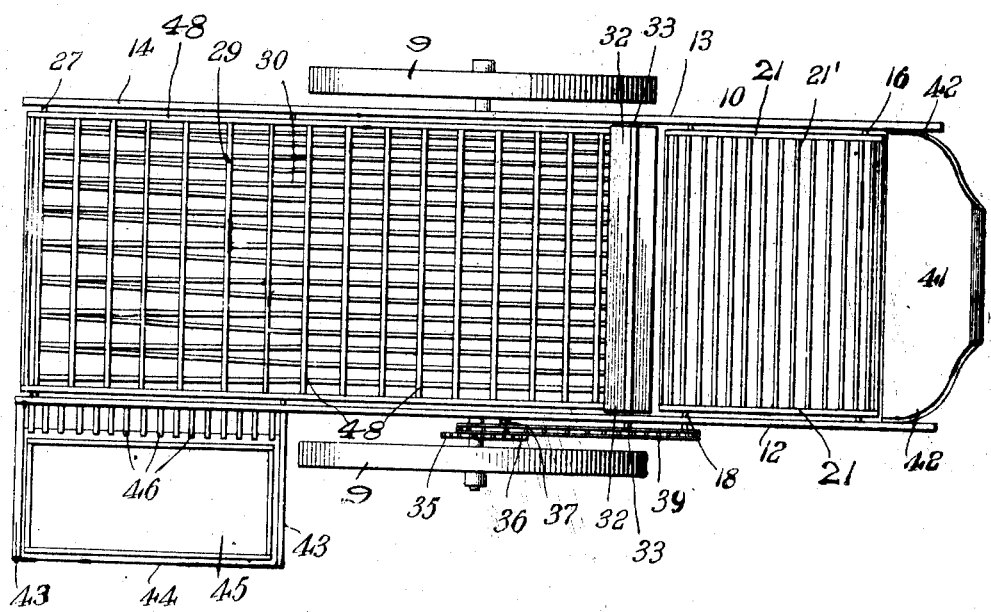
Figure 4:
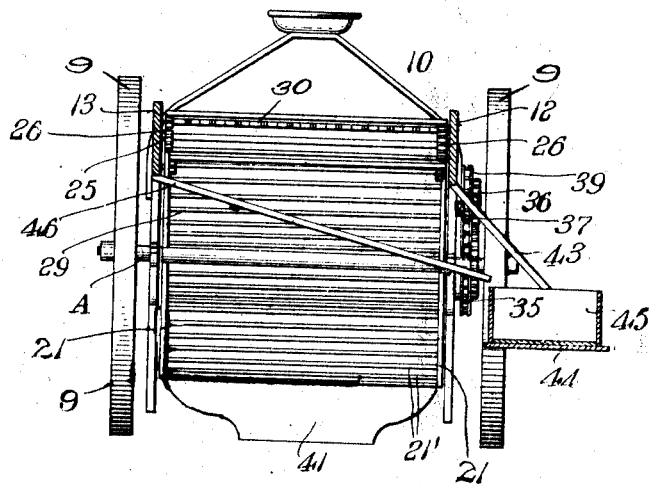

In the drawings forming a portion of this specification, and in which like numerals of reference indicate similar parts in the several views, Figure 1 is a side elevational view of the present invention, Fig. 2 is a vertical longitudinal sectional view through the same, Fig. 3 is a top plan view, Fig. 4 is a vertical transverse sectional view on the line 4—4 of Fig. 1.
In carrying out the object of my invention, I employ a suitable shaft A to the ends of which are fixed the wheels 9 so that the shaft A rotates with the wheels. Secured to this shaft A are two similar side boards or members 12 and 13 shown in the top view in Fig. 3, and these side members in front are connected to a shovel point 41, which has its rear emptying end 42 curved upward as disclosed in Fig. 2.
Transversely disposed below the emptying end of the shovel point 41, is a transverse conveyer shaft 16 which at each end carries a belt sprocket 17. Positioned to the rear of the shaft 16 is a similar conveyer shaft 18 and this shaft 18 at each end carries a belt sprocket 19. Two endless belts 21 are made to pass over these sprockets 17 and 19, and transversely carried by these belts 21 are the rods 21' which form an endless grate conveyer. At one end, the shaft 18, as shown in Fig. 1, is provided with a chain sprocket 20. Positioned adjacent to the shaft 18, is a shaft 33 carrying the beater blades 32. This beater shaft 33 upon one side is also provided with a driving chain sprocket 34, as shown in Fig. 1.

In referring to Fig. 1, it will be noticed that the two side boards 12 and 13 have their major portions inclined, each board, however, terminating in a horizontally disposed end 14. Positioned immediately below the beater, is a driving conveyer shaft 22, which shaft at each end carries a belt sprocket 23, and upon the outside, as shown in Fig. 1, is further provided with a chain sprocket 24. The shaft 22 is positioned below and adjacent to said shaft 18, and held in spaced relation thereto.

Positioned adjacent to the main supporting axle A is a stub shaft 37, and this stub shaft 37 carries a gear 36 meshing with a gear 35 secured to the axle A. In addition to the gear 36, the stub shaft 37 supports a chain sprocket 38, the sprocket 38 and gear 36 being connected. A suitable chain 39 passes over the chain sprockets 24, 20, 34 and 38. Transversely secured within the end portions 14 of the side boards is a terminal shaft 27 at each end carrying a belt sprocket 28. At the point where the horizontally disposed portion 14 extends from the inclined portion of the side boards is positioned a supporting shaft 25 carrying two belt sprockets 26, and below this shaft 25 is a shaft 25' carrying a smaller sprocket, as shown in Fig. 2.

Passing over the belt sprockets 23, 26 and 28, are two endless belts 48, and these belts are connected by a plurality of transversely disposed bars 29, so as to form an endless grate conveyer. The upper portion of this conveyer grate is supported by means of the gears 26 while the lower portion of this endless grate is supported upon the shaft 25'. Held upon the transversely positioned brace rods 31, as shown in Fig. 2, are a plurality of longitudinally disposed supporting grate bars 30, which bars have their lower ends disposed in parallel relation as shown in Fig. 3, while at their upper ends, said bars have their ends connected in sets of twos, so that the space between said grate bars at the discharge end of the digger gradually increases, as is clearly shown in said Fig. 3. Extending from the side board 12, are the brace rods 43 which support a suitable platform 44, upon which platform is placed a suitable crate or other receptacle 45 to receive the harvested potatoes. Secured to the side member 13, as shown in Fig. 4, are a plurality of horizontally disposed grate bars 46 which terminate above the platform 44 and are arranged to empty into the receptacle carried upon said platform 44. As described, I provide a simple conveyer mechanism, which is operated by a single chain 39. This chain simultaneously rotates the conveyer shafts 18 and 22, as well as actuating the beater shaft 33.

The operation of this invention is very simple. As the digger is carried through the field, the shovel scoops all of the potatoes with the clinging vines out of the earth, and these, with the attaching soil are deposited upon the grate conveyer within the forward portion of the machine. As the potatoes and vines encounter the beater 32, they are separated and drop upon the coarser grate conveyer, the dropping of the potatoes loosening the earth which drops through the open grate conveyer and between the bars 30. The potatoes are then dragged upward and soon find an escape between the diverging ends of the bars 30, the vines that remain clinging to the potatoes being torn off and dropping at the rear of the machine. The potatoes after escaping from between the bars 30 engage the grate 46 and are then deposited in the receptacle 45.

The device is simple of construction and readily operated, and having thus described my said invention what I claim as new and desire to secure by U. S. Letters Patent is:—

In a device of the character described, a conveyer operating mechanism comprising two side bars, a wheel supported axle secured to said side bars, a gear on said axle, a conveyer shaft held between said side boards, a chain sprocket carried by said shaft, a second conveyer shaft positioned below and adjacent to said first mentioned shaft, a chain sprocket secured to said last mentioned shaft, a beater shaft held above said last mentioned shaft and to the rear of said first mentioned shaft, a chain sprocket carried by said beater shaft, a stub shaft carried by one of said side boards, a gear upon said stub shaft having an integral chain sprocket, said shaft and axle gear meshing, and a driving chain engaging all of said sprockets, in the manner shown.

In testimony whereof I affix my signature, in presence of two witnesses.

JOHN R. COOK.

Witnesses:
   FLOYD E. LOCKWOOD,
   JAMES L. WELCH.